July 31, 1962    J. J. MORRISSEY    3,046,630
CROSS CHAIN END CLIP
Filed July 27, 1959
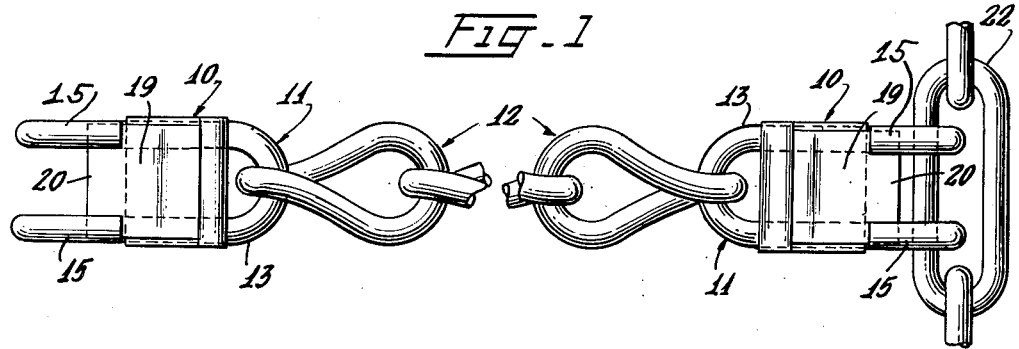
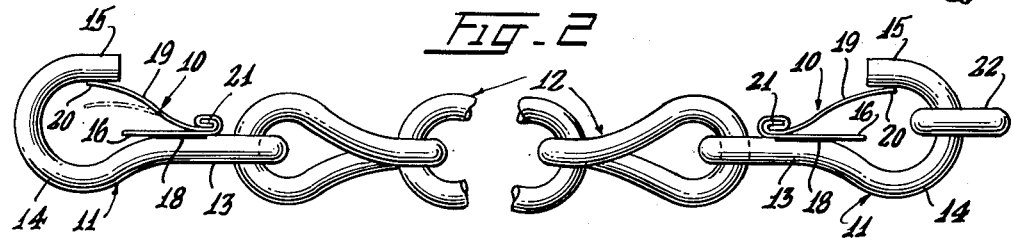
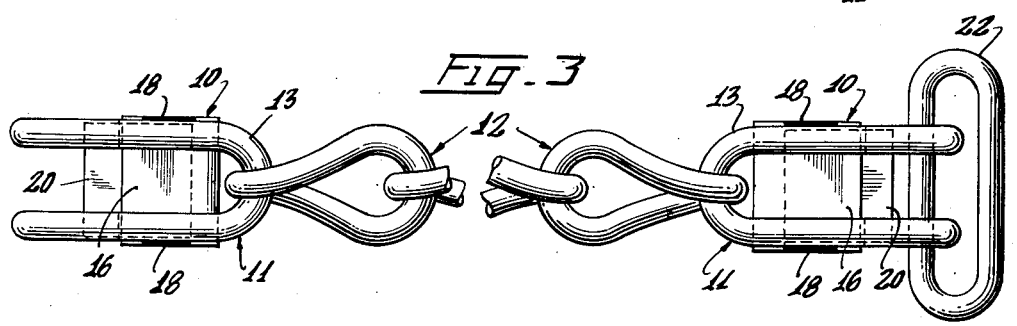
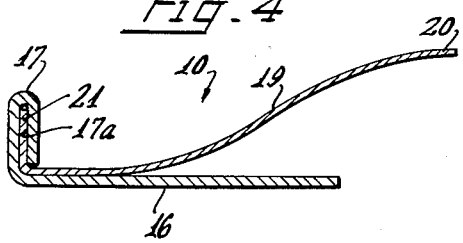
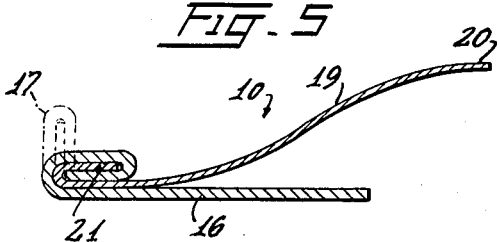
INVENTOR.
JOHN J. MORRISSEY.
BY
H. G. Manning
ATTORNEY.

United States Patent Office 3,046,630
Patented July 31, 1962

3,046,630
CROSS CHAIN END CLIP
John J. Morrissey, 289 Charles St., Torrington, Conn.
Filed July 27, 1959, Ser. No. 829,771
1 Claim. (Cl. 24—236)

This invention relates to tire chains and more particularly to a snap-on spring clip and a method for detachably securing the end link of a tire cross chain to the lengthwise side chain members of an anti-skid vehicle chain set.

The principal object of this invention is to provide a tire chain spring clip of the above nature which can be easily applied permanently to the U-shaped end link of a cross chain during manufacture.

A more particular object is to provide a tire chain spring clip assembly of the above nature including a base member welded to the side sections of a standard U-shaped end link of a cross chain, said base member having a resilient locking clip secured thereto.

Still another object is to provide a method of assembling a spring clip of the character described wherein one end of the locking clip member will be securely clamped to the base member after the base member has been welded to its U-shaped end link.

Another object of the invention is to provide a spring clip assembly of the above nature which will be simple in construction, inexpensive to manufacture without the use of special tools, compact, and very efficient and durable in use.

Other objects, features and advantages of the invention will be apparent from the following description when read with reference to the accompanying drawing, wherein:

FIG. 1 is a plan view of a portion of a cross chain equipped with a pair of U-shaped end spring clips embodying the invention, one of which is shown connected to a link of a lengthwise side chain.

FIG. 2 is a side view of the chain assembly shown in FIG. 1.

FIG. 3 is a bottom view thereof, and

FIGS. 4 and 5 are side views in cross-section on an enlarged scale, of the base and spring locking clip of a standard cross chain link, and illustrate the method of securely interconnecting the base and clip members after the base member has first been welded to the U-shaped end link of the cross chain.

Referring now in detail to the drawing, wherein like reference numerals denote corresponding parts throughout the several views, the numeral 10 designates generally the snap-on spring clip embodying the invention. FIGS. 1, 2 and 3 show a pair of such spring clips 10 secured to the opposite standard U-shaped end links 11 of a cross chain 12 forming part of a vehicle anti-skid chain set. Each end link 11 is formed of a single length of heavy steel wire folded upon itself to provide two parallel spaced side portions 13 having downwardly-bent parallel portions 14 which terminate in semi-circularly-bent upstanding end top hooks 15.

Each spring clip 10 comprises a rectangular strip metal base member 16 preferably of malleable non-carbon steel, which as illustrated in FIG. 4, is initially formed at one end with an upstanding loop portion 17 providing a narrow opening 17a for receiving the upturned end 21 of a resilient locking spring clip member 19, as is hereinafter described.

As best shown in FIGS. 2 and 3, the base member 16 is first welded against the upper surfaces of the side portions 13 of a standard U-shaped end link 11 on two lines 18, with the upstanding loop portion 17 thereof opposite the open ends of the top hooks 15 of said end link. The locking spring clip member 19, which preferably is of tempered steel, is reversely curved to form a resilient finger portion 20 at one end, and has an upturned portion 21 at the other end thereof, which, after the welds 18 have cooled, is slid into the opening 17a in the upstanding loop portion 17 of the base member 16, as shown in FIG. 4. The heat of welding the base member 17 thus cannot affect the temper of the resilient locking spring steel clip member 19.

As illustrated in FIG. 5, the upstanding loop portion 17 is then folded downwardly against the upper surface of the base member 16, bending and securely compressing the upturned portion 21 of the locking clip member 19 from the dotted to the full-line position, as shown in FIG. 5. In this final folded-over position of the loop portion 17 of the base member 16, the end finger 20 of the resilient spring clip portion 19 will press against the inner portions of the ends of the hooks 15, as illustrated in FIG. 2.

As illustrated in FIGS. 1, 2, and 3, a link 22 of a side chain member can readily be assembled to an end link 11 equipped with a spring clip 10 merely by pushing one side of the link 22 against the outer end of the resilient finger portion 20 of the locking clip member 19, depressing it and allowing it to enter within the circularly-bent end portions 15 or hooks of said end link 11. Disassembly can be effected, thereafter, only upon manually depressing the resilient finger portion 20 of the locking clip member 19.

One advantage of the improved spring clip herein disclosed is that it may easily be installed in and removed from an anti-skid chain even while the latter is still on a tire.

While there has been disclosed in this specification one form in which the invention may be embodied in practice, it is to be understood that this form is shown for the purpose of illustration only, and that the invention is not limited to the specific disclosure, but may be modified and embodied in other equivalent forms, without departing from its spirit. In short, the invention includes all the modifications and embodiments coming within the scope of the following claim.

Having thus fully described the invention, what is claimed as new and for which it is desired to secure Letters Patent is:

In a non-skid chain clip for use with a standard U-shaped end link having spaced parallel side members terminating in spaced inturned parallel semi-circular top hook members, the combination comprising a rectangular bottom strip metal base member of malleable iron extending between and welded at its sides to the parallel side members of said link, a resilient outwardly and upwardly extending leaf spring of thin tempered spring strip metal having an initially upstanding inner end, means for securing the inner upstanding end of said leaf spring to the inner end of said base member by means of an upstanding inturned loop at the inner end of said base member which embraces the inner end of said leaf spring clip, said loop being pressed downwardly upon the bottom of said base member, the free end of said leaf spring resiliently pressing upwardly against the inner portions of the semi-circular members of said link near the open ends thereof.

References Cited in the file of this patent
UNITED STATES PATENTS

| | | |
|---|---|---|
| 85,742 | Comte | Jan. 12, 1869 |
| 1,499,932 | Jacobson | July 1, 1925 |
| 1,878,291 | Parons | Sept. 20, 1932 |
| 2,260,215 | Donaldson | Oct. 21, 1941 |
| 2,334,677 | Konikoff | Nov. 16, 1943 |